(12) United States Patent
Smith et al.

(10) Patent No.: US 7,677,261 B1
(45) Date of Patent: Mar. 16, 2010

(54) HIGH FLOW, LOW MOBILE WEIGHT QUICK DISCONNECT SYSTEM

(75) Inventors: Ronn G. Smith, Sheridan, WY (US); Zoltan Frank Nagy, Jr., Titusville, FL (US); Joseph Roch Moszczienski, Titusville, FL (US)

(73) Assignee: Big Horn Valve, Inc., Sheridan, WY (US)

( * ) Notice: Subject to any disclaimer, the term of this patent is extended or adjusted under 35 U.S.C. 154(b) by 1836 days.

(21) Appl. No.: 10/283,694

(22) Filed: Oct. 29, 2002

Related U.S. Application Data

(60) Provisional application No. 60/340,715, filed on Oct. 29, 2001.

(51) Int. Cl.
*F16L 29/00* (2006.01)
(52) U.S. Cl. .................. 137/1; 137/614.02; 137/614.05
(58) Field of Classification Search .................. 137/614, 137/614.02, 614.03, 614.04, 614.05; 251/149.1, 251/149
See application file for complete search history.

(56) References Cited

U.S. PATENT DOCUMENTS

| | | | |
|---|---|---|---|
| 194,973 | A | 9/1877 | Phillips |
| 222,680 | A | 12/1879 | Dows |
| 286,508 | A | 10/1883 | Vadersen et al. |
| 332,731 | A | 12/1885 | Miller |
| 609,207 | A * | 8/1898 | Medbery ..................... 137/595 |
| 985,079 | A | 5/1910 | Bennett |
| 960,675 | A | 6/1910 | Murphy |
| 1,317,789 | A | 10/1919 | Hoar |
| 1,334,870 | A | 3/1920 | Lowry |
| 1,443,231 | A | 1/1923 | McCauley |
| 1,556,979 | A | 10/1925 | Uschman |
| 1,777,434 | A | 10/1930 | Herzbrun |
| 2,198,455 | A | 4/1940 | Mueller et al. .............. 251/150 |

(Continued)

FOREIGN PATENT DOCUMENTS

DE    1 147 094    7/1958

(Continued)

OTHER PUBLICATIONS

Backflow Prevention Assemblies: Why They Are Needed, Febco Industries, pp. 1-3 (1992).

(Continued)

*Primary Examiner*—Kevin L Lee
(74) *Attorney, Agent, or Firm*—Antoinette M. Tease

(57) ABSTRACT

A fluid coupling device and coupling system that may start and stop the flow of a fluid is disclosed. In some embodiments, first and second couplings are provided having an actuator coupled with each of the couplings. The couplings and actuators may be detachable to provide quick disconnect features and, in some embodiments, provide unitary actuation for the actuators of the coupling device to facilitate connection in mobile applications. Actuation may occur as the two couplings and actuators are engaged and disengaged and may occur by rotational actuation of the actuators. Rotational actuation can be provided to ensure flow through the coupling device, which in some embodiments may further provide an offset venturi feature. Upon disengagement, a compression element such as a compression spring can be provided to return the actuators to a closed position. Some embodiments further provide a seal external to the actuators and provided at incipient engagement of the couplings.

33 Claims, 10 Drawing Sheets

U.S. PATENT DOCUMENTS

| | | | | |
|---|---|---|---|---|
| 2,304,303 | A | 10/1942 | Ferguson | 166/2 |
| 2,507,467 | A | 5/1950 | Fredrickson et al. | 137/69 |
| 2,508,958 | A | 5/1950 | Manville | 15/129 |
| 2,750,962 | A | 6/1956 | Kreitchman et al. | 137/625.48 |
| 2,767,019 | A | 10/1956 | Manville | 299/58 |
| 2,822,818 | A | 2/1958 | Breznick | 137/454.6 |
| 2,894,695 | A | 7/1959 | Beltcher et al. | 239/443 |
| 2,941,820 | A * | 6/1960 | Kallis | 137/599.02 |
| 2,949,240 | A | 8/1960 | Koolnis | 239/200 |
| 2,977,988 | A | 4/1961 | Drobilitis et al. | 137/625.17 |
| 3,073,566 | A | 1/1963 | Bredtschneider | 251/362 |
| 3,096,786 | A | 7/1963 | Rost | 137/596.2 |
| 3,145,010 | A | 8/1964 | Karr, Jr. | 251/210 |
| 3,176,720 | A | 4/1965 | Donahue | 137/625.44 |
| 3,273,851 | A | 9/1966 | Rosch, Jr. et al. | 251/124 |
| 3,424,189 | A | 1/1969 | Woodford | 137/218 |
| 3,506,030 | A | 4/1970 | Vesco | 137/595 |
| 3,521,667 | A | 7/1970 | Johnson | 137/454.6 |
| 3,533,554 | A | 10/1970 | Mongerson | 239/27 |
| 3,736,959 | A | 6/1973 | Parkison | 137/625.17 |
| 3,749,355 | A | 7/1973 | Paul, Jr. | 251/124 |
| 3,762,682 | A | 10/1973 | Franck | 251/124 |
| 3,779,508 | A | 12/1973 | Paul, Jr. | 251/124 |
| 3,848,806 | A | 11/1974 | Samuelsen et al. | 239/265.11 |
| 3,954,250 | A | 5/1976 | Grace | 251/144 |
| 4,022,243 | A | 5/1977 | Edwards | 137/360 |
| 4,066,090 | A | 1/1978 | Nakajima et al. | 137/62 |
| 4,117,856 | A | 10/1978 | Carlson | 137/62 |
| 4,178,956 | A | 12/1979 | Fillman | 137/360 |
| 4,200,124 | A | 4/1980 | Stratynski et al. | 137/885 |
| 4,261,332 | A | 4/1981 | Stewart | 126/420 |
| 4,301,972 | A | 11/1981 | Rudelick | 239/443 |
| 4,316,481 | A | 2/1982 | Fillman | 137/302 |
| 4,475,570 | A | 10/1984 | Pike et al. | 137/218 |
| 4,483,361 | A | 11/1984 | Jungbert, Sr. | 137/301 |
| 4,520,836 | A | 6/1985 | Hutter, III | 137/59 |
| 4,532,954 | A | 8/1985 | Fillman | 137/302 |
| 4,596,377 | A | 6/1986 | Taylor | 251/248 |
| 4,672,247 | A | 6/1987 | Madsen et al. | 310/49 |
| 4,691,135 | A | 9/1987 | Sogabe et al. | 310/254 |
| 4,809,732 | A | 3/1989 | Buehler | 137/209 |
| 4,844,116 | A | 7/1989 | Buehler et al. | 137/360 |
| 4,899,073 | A | 2/1990 | Takeuchi et al. | 310/116 |
| 4,903,578 | A | 2/1990 | Terp | 91/499 |
| 4,976,237 | A | 12/1990 | Bollinger | 123/339 |
| 5,004,157 | A | 4/1991 | Martell | 239/205 |
| 5,087,868 | A | 2/1992 | Ishibashi et al. | 318/696 |
| 5,148,895 | A | 9/1992 | Kakizaki | 188/299 |
| 5,283,495 | A | 2/1994 | Wendel et al. | 310/257 |
| 5,333,833 | A | 8/1994 | Reinicke | 251/77 |
| 5,355,905 | A | 10/1994 | Burgess et al. | 137/1 |
| 5,413,134 | A | 5/1995 | Burgess et al. | 137/1 |
| 5,573,186 | A | 11/1996 | Loschelder | 239/436 |
| 5,579,800 | A | 12/1996 | Walker | 137/15 |
| 5,611,516 | A | 3/1997 | Reinicke et al. | 251/77 |
| 5,622,203 | A | 4/1997 | Givier et al. | 137/337 |
| 5,718,257 | A | 2/1998 | Burgess | 137/218 |
| 5,786,649 | A | 7/1998 | Roberts | 310/36 |
| 5,811,898 | A | 9/1998 | Everingham | 310/36 |
| 5,842,680 | A | 12/1998 | Bustamante et al. | 251/65 |
| 5,937,885 | A * | 8/1999 | Sampson | 137/1 |
| 6,026,845 | A | 2/2000 | Walrath et al. | 137/360 |
| 6,079,445 | A * | 6/2000 | Huang | 137/614.04 |
| 6,109,293 | A | 8/2000 | Walrath et al. | 137/360 |
| 6,279,595 | B1 | 8/2001 | Walrath et al. | 137/14 |
| 6,431,519 | B1 | 8/2002 | Smith | 251/65 |
| 6,609,532 | B1 * | 8/2003 | Peterson | 137/15.18 |

FOREIGN PATENT DOCUMENTS

| | | |
|---|---|---|
| FR | 2 638 503 | 10/1989 |
| GB | 920698 | 10/1959 |
| GB | 920710 | 10/1959 |
| WO | WO 99/13250 | 3/1999 |

OTHER PUBLICATIONS

Beckwith, T., Marangoni, R., and Lienhard, J.V., Obstruction Meters, Mechanical Measurements, 5th ed., (1993), pp. 617.

Cardin, J., Reinicke, R.H., and Bruneau, S., A Lifting Ball Valve for cryogenic fluid applications, JHU, JANNAF Propulsion Meeting, 1993, vol. 2, p. 297-312.

Cross Connection Control Handbook, Febco Industries, pp. 1-16.

Fox & McDonald, Laminar and Turbulent Flows, Introduction to Fluid Mechanics, 1973, pp. 43-44, 312-313.

Model B60, 65 and 25: Freezeless Wall Faucets, Woodford Mfg. Co. Brochure, rev. Jun. 1991, 3 pages.

Munson, B., Young, D., and Okiishi, T., Fundamentals of Fluid Mechanics, 2d. ed., 1994, pp. 492-501, 555-559.

Quarterhorse 1/4 Turn Non Freeze Wall Hydrant, Jay R. Smith Mfg. Co Brochure, 1990, 4 pages.

Remote Mechanical Valve Actuator, McMaster Carr Co. Catalog, 1 pg. (1989).

Rotary Solenoids, Ledex Manufacturing, (1999), pp. 2-4.

U.S. Appl. No. 60/340,715, entitled "High Flow, Low Mobile Weight Quick Disconnect System", filed Oct. 29, 2001.

U.S. Appl. No. 60/347,289, entitled "Magnetically Actuated Axial Valve With Conical Rotating Seal", filed Jan. 11, 2002.

Standard Port Bronze Apollo with Center Brain, Apollo advertisement, 1 page.

Watts Series TWS Wall Hydrant, Watts Regulator advertisement, 1 page.

* cited by examiner

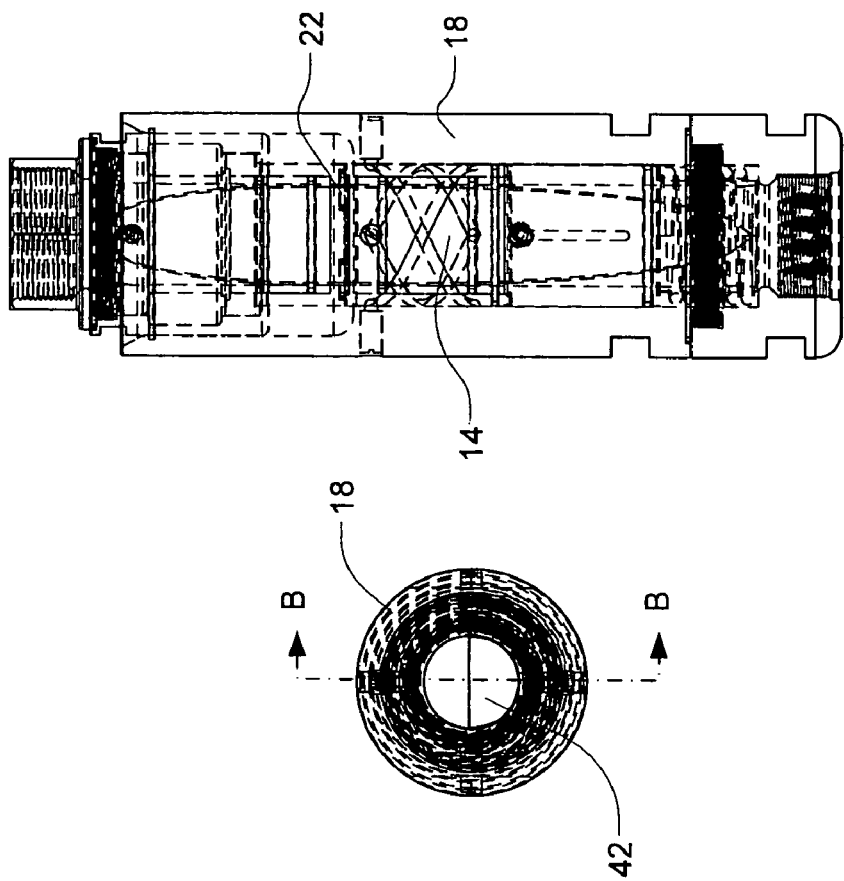
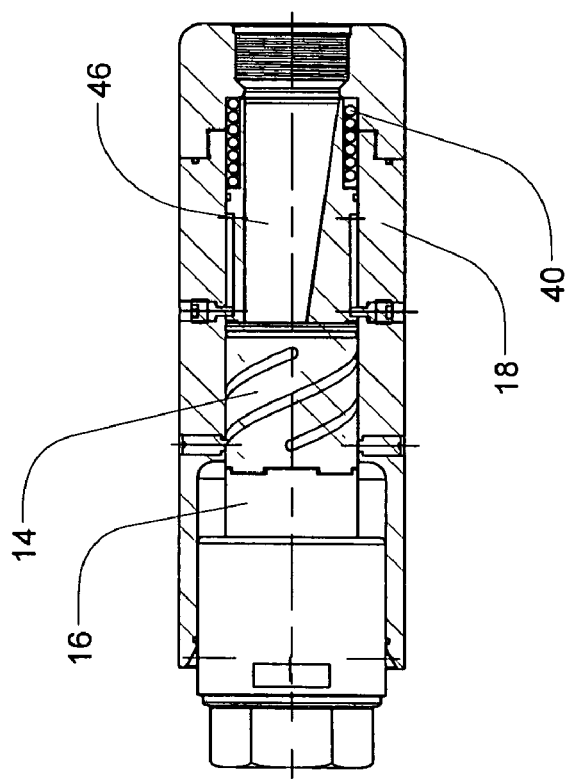
FIG. 8C
FIG. 8B
FIG. 8A

HIGH FLOW, LOW MOBILE WEIGHT QUICK DISCONNECT SYSTEM

This application claims the benefit of U.S. Provisional Application 60/340,715, filed Oct. 29, 2001, hereby incorporated by reference.

GOVERNMENT RIGHTS

The U.S. government has a paid-up license in this invention and the right in limited circumstances to require the patent owner to license others on reasonable terms as provided for by the terms of Contract No. SBIR-00-1 awarded by NASA.

FIELD OF THE INVENTION

The present invention relates generally to quick disconnect or coupling devices which may start and stop the flow of any fluid or even perhaps vacuum from a supply line to a discharge line or point of use. Specifically, the present invention may be especially applicable to fluid supply applications, such as fuel supply, and to mobile support applications such flight vehicle preparation and launch, particularly those applications involving cryogens.

BACKGROUND OF THE INVENTION

Prior quick disconnect designs can often incur high pressure drop and associated energy losses at rated fluid flow conditions creating flow resistance in the system. For what may be the dominant technology, the poppet style quick disconnect, this flow resistance may be attributed to the tortuous and restricted flow path around the outside of the retracting poppets. The problem may become particularly troublesome when cryogens are pumped over long distances or through a complex configuration of valves and disconnects. Some efforts to address the problems of flow resistance may require larger pumps and more energy consumption to compensate for flow losses, creating additional problems relative to such past attempts in disconnect technology.

Furthermore, prior quick disconnect designs can typically waste a significant amount of fluid to the environment each time mating and de-mating occurs, creating fluid spillage and other potentially negative results. The spillage volume can be a function of the interface geometry of the mating halves of the disconnect. Aside from wasting valuable fluid, the problem can also pose safety risks if the fluid is toxic or an explosive substance such as liquid hydrogen.

Prior quick disconnect designs may also typically require high component weight to achieve required flow rates, representing a high mass-to-flow ratio. This can be a function of the length, envelope and complexity of the disconnect. Of particular concern for flight fueling systems, is the weight of the flight side half of the quick disconnect, which is attached to the launch or other vehicle and must be lifted into space or elsewhere. These prior designs may further require unacceptable engagement forces necessary to ensure proper operation, leading to an unnecessarily burdensome engagement sequence.

SUMMARY OF THE INVENTION

Objects of the present invention may be to provide an alternative technology that may achieve high flow, low energy loss, low mass, minimum spillage and low engagement force. The present invention may also address potential limitations that may have existed in presently employed technologies such as those previously described.

Other objectives and goals may be disclosed throughout this application for patent, including the written description, drawings, and claims. In addition, all objectives and goals may apply either in dependent or independent fashion to a variety of other objectives and goals, and in a variety of embodiments, consistent with the present disclosure.

Therefore, the present invention may provide a fluid coupling device comprising a first coupling, an actuator coupled with the first coupling, a second coupling configured to detachably engage the first coupling, and an actuator coupled with the second coupling, wherein the actuators are unitarily rotationally actuated. The present invention further provides coupling devices to provide coupling of fluid, fluid coupling systems, and fluid coupling devices. Further, methods of coupling fluid and other methods and process embodiments are also disclosed. Other embodiments may be disclosed throughout this application for patent, including those embodiments disclosed in the written description, drawings, and claims.

In some embodiments, the present invention the fluid quick disconnect or coupling device may control the flow of a variety of fluids, but especially of cryogens, particularly even from a ground-based fuel supply system to a launch vehicle. Both ground and flight, or more generally "mobile" halves of the disconnect may incorporate the patented Venturi Off-Set Technology (VOST) flow path and rotary shutoff concept. Engagement may occur as the two halves are forced together axially by an externally driven carrier plate. Prior to engagement, any fluid flow may be blocked for each half of the disconnect. At incipient engagement, but prior to component rotation, an outer seal between the two halves may be made, which may then prevent external leakage during fluid flow. Once engaged, the two halves may be designed to rotate so as to enable full flow through the venturi flow path. Upon disengagement, a compression spring may then return the two halves to a closed position prior to separation of the external seal.

BRIEF DESCRIPTION OF THE DRAWINGS

FIG. 8A is a cross-section of an embodiment of the present invention depicted through line B-B of the front view shown in FIG. 8B and FIG. 8C is front view of the embodiment.

DETAILED DESCRIPTION OF PREFERRED EMBODIMENTS

As can be easily understood, the basic concepts of the present invention may be embodied in a variety of ways. These concepts involve processes or methods as well as devices, various apparatus, and systems, many of the devices, apparatus, and systems accomplishing the disclosed processes or methods. In addition, while some specific designs are explicitly shown, it should be understood that these not only accomplish certain methods but also can be varied in a number of ways.

The present invention may address potential limitations associated with current designs of quick disconnects in a variety of ways. Flow resistance may be minimized by incorporating a Venturi Offset Technology (VOST™) flow passage in both halves of the quick disconnect. Such technology is described in U.S. Pat. Nos. 6,279,595, 6,026,845, 6,109,293, and in WIPO Publication No. WO 99/13250, among other related references all hereby incorporated by reference.

Figure 1:
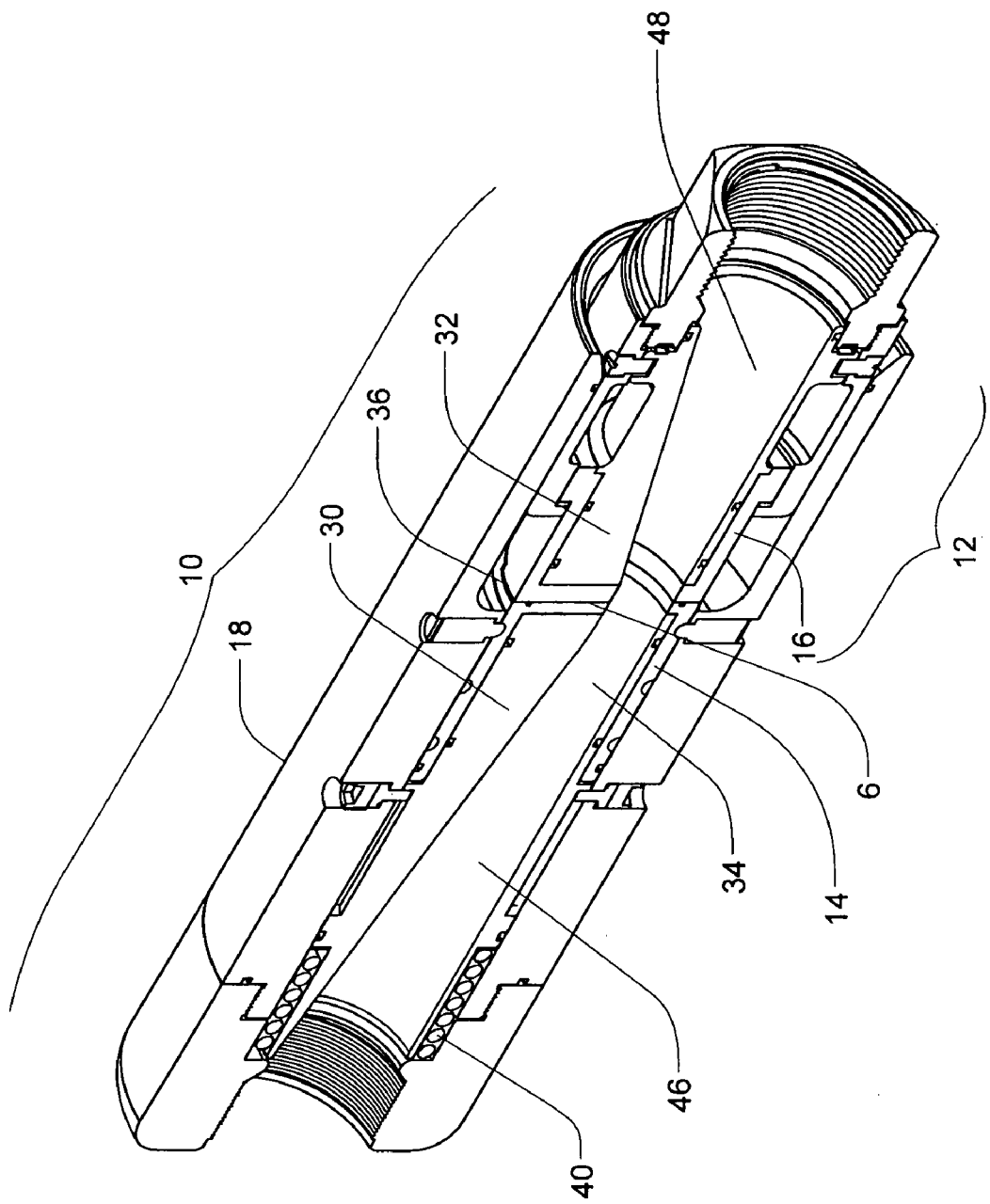
FIG. 1 is a cut away view of one embodiment of the present invention showing an engaged coupling device.
Figure 2:
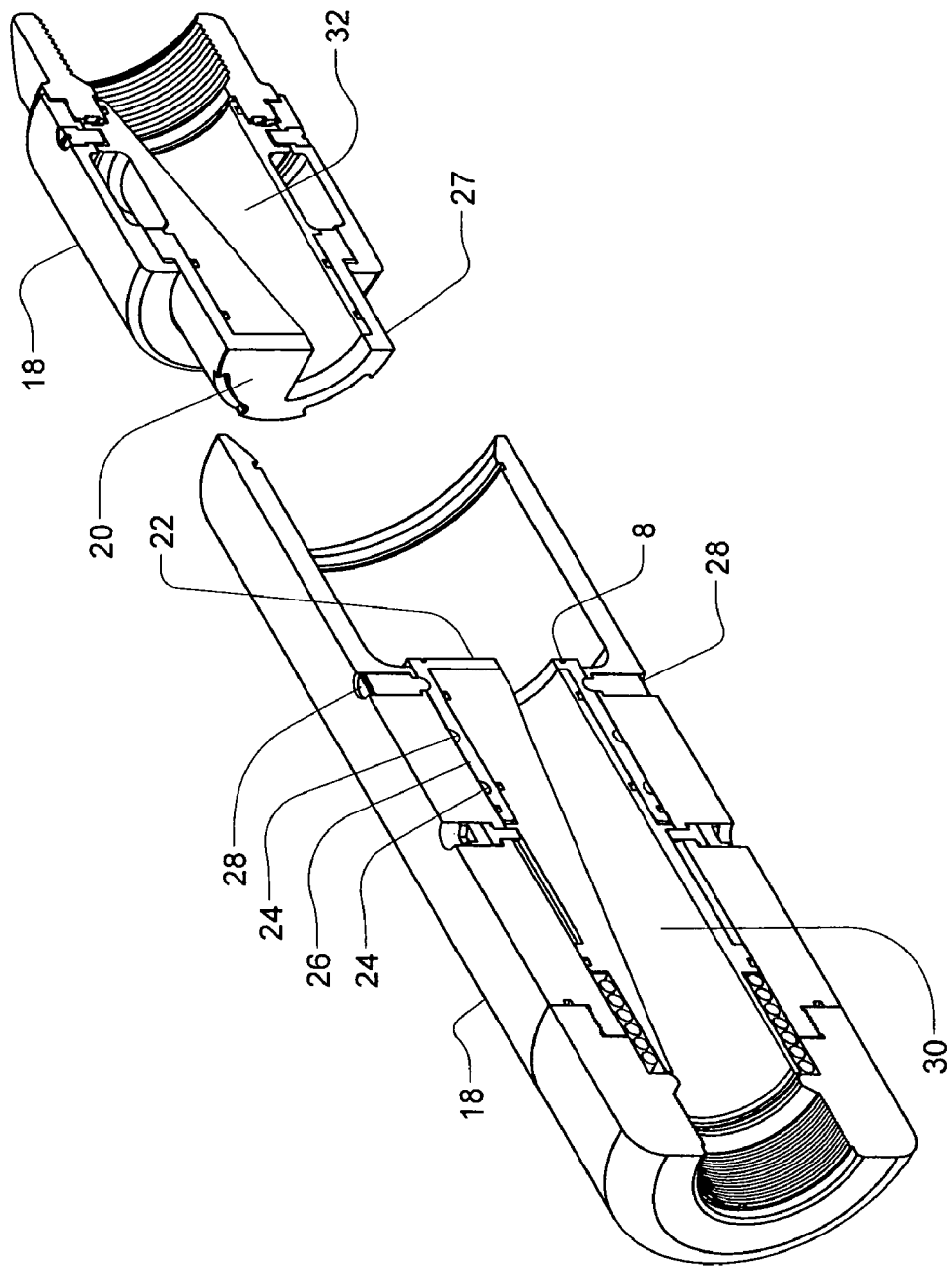
FIG. 2 is a cut away view of the embodiment shown in FIG. 1 with two portions of the device de-mated or otherwise disengaged.

Accordingly, and as shown in FIG. 1, the present invention may afford a minimally restricted flow path with the disconnect in the mated position. Spillage may be minimized by direct contact and interlocking between the rotating faces of the two halves of the quick disconnect. The direct contact and interlocking may be initiated prior to fluid flow and sustained beyond the stoppage of flow. FIG. 2 illustrates this feature of the embodiment by depicting the de-mated position. An O-ring seal 8 in the ground side face may be incorporated to prevent fluid leakage to the cavity 6 formed upon mating.

More broadly stated, a first fluid coupling 10 and a second fluid coupling 12 are shown in FIG. 1, referred to in some embodiments as halves of the quick disconnect. Actuators 14 and 16 are further provided, each actuator coupled with a respective one of the couplings. The actuators may be rotationally actuated, and in some embodiments, unitarily rotationally actuated, as further described below.

Figure 3:
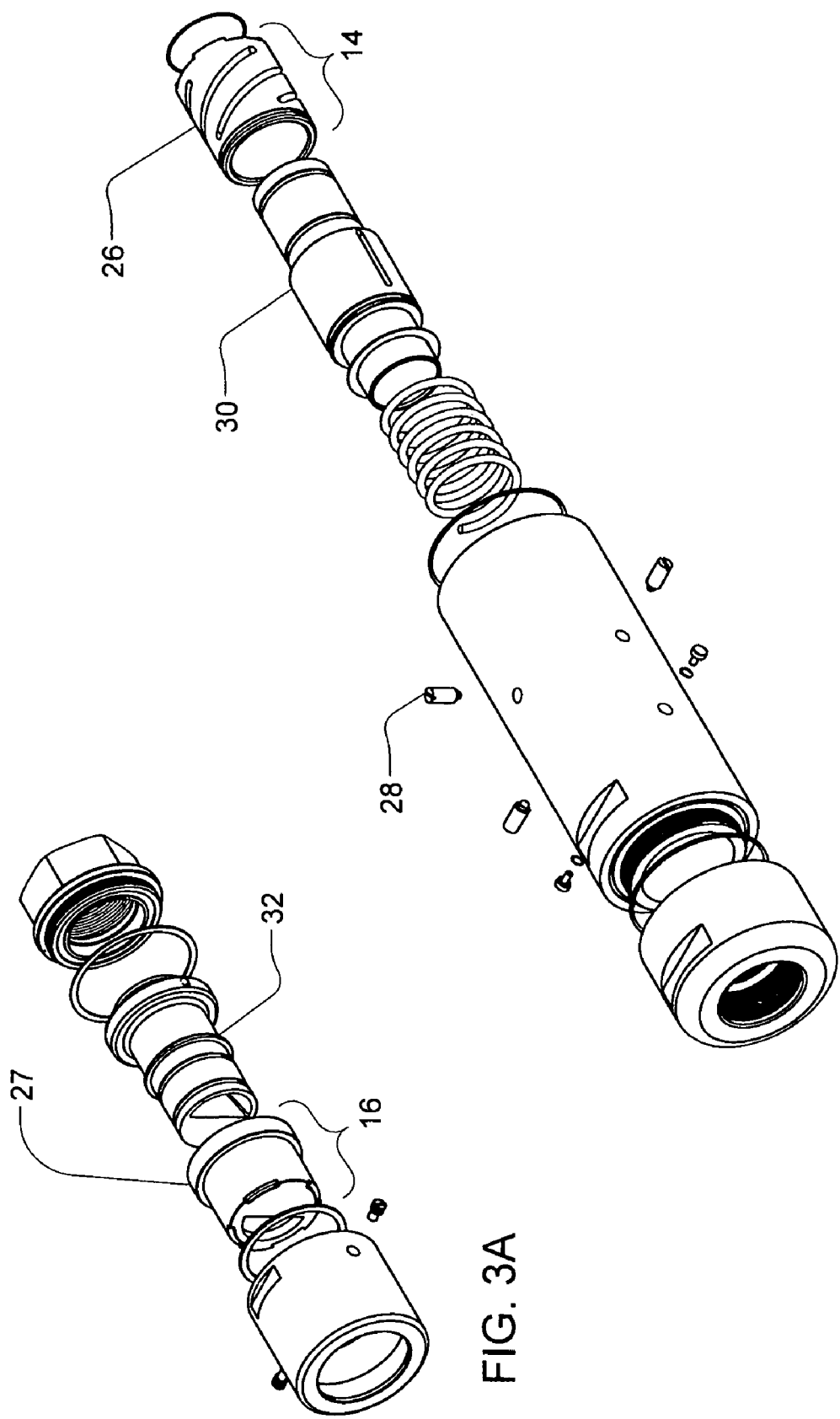
FIGS. 3A and 3B are exploded views of the entire device (both portions) of the embodiment shown in FIGS. 1 and 2.

The present invention, in some preferred embodiments, may minimize flight side mass by placing most of the actuation mechanism on the ground side of the quick disconnect. FIG. 2 illustrates the distribution of mass between the two sides in one embodiment. FIG. 3 show an exploded view of an embodiment, illustrating its low piece count and simple design. It can be seen from the illustrations that each half of the quick disconnect may also function as an open-close valve.

The two halves of the quick disconnect device may be engaged axially by external or other force, whether manual, hydraulic, pneumatic, etc. In a preferred embodiment, engagement may be provided by movement of the carrier plate, which may contain the ground half of the quick disconnect. The carrier plate may also assure axial alignment prior to engagement. Initial contact between the two sides may occur at the outer housing 18. The housing may contain a ring seal 8 that may isolate the intermediate cavity 6, in some embodiments a spill cavity, formed by this contact, from the environment. Shortly after the ring seal is made, the rotating, inner faces 20, 22 of the two sides may make contact and may then lock together such as in tongue-and-groove fashion. Further axial movement may then be converted into synchronous rotation of these two faces, herein referred to as collars, by means of spiral grooves 24 in the ground-side collar 26. Spring loaded ball pins 28, mounted to the ground-side outer housing, may engage these spiral grooves, providing couple with the actuator, and may then force the collars to rotate about 180 degrees and may allow axial motion to be completed. The inner tubes or cartridges 30, 32 that form the flow path, and in some embodiments venturi portions and a venturi 34, collectively, may be constrained from rotating by means of longitudinal guides and matching locator pins, which may be fixed to the outer housing. Some preferred embodiments may provide an offset venturi, as shown for example in FIG. 1. Hence, the process of engagement may culminate in a fully open flow passage in both halves of the quick disconnect, as illustrated in FIG. 1.

More broadly stated, actuators 14 and 16, in some preferred embodiments comprising collars 26 and 27, may be unitarily rotationally, and in some embodiments, actuated upon axial movement of at least one actuator, as further described below. Preliminarily, but incorporating aspect of the present invention, as couplings 10 and 12 are moved axially toward engagement, housing 18 of coupling 10 contacts housing 18 of coupling 12, forming a seal at seal 8 and an engaged configuration of the couplings. This engaged configuration, in some embodiments may form cavity 6, which may serve as a spill cavity for excess fluid during actuation of actuators or as a cavity to hold measuring devices, such as a flow meter, a pressure meter, a leak detection device, or the like. It should be noted that axial movement may be accomplished by one or both couplings. In some embodiments, one of said couplings may be fixed, as in attached or coupled with a fuel source or vehicle.

Further relative axial movement of couplings 10 and 12 move coupled actuators 14 and 16 into contact or engagement. The axial movement may be defined, in some embodiments, as axial movement along a flow axis of a coupling, as shown. In one embodiment, collars 26 and 27 are brought into engagement via an engagement element. The engagement element may comprises various configurations of portions of collars 26 and 27, in some embodiments, but may preferrably be provided as a rotary interlock 36. In one embodiment, best shown in FIGS. 6 and 7, each collar 26, 27, the rotary interlock may comprise at least one tongue and groove arrangement 37 of the collars, and may specifically comprise at least one boss 38.

As the couplings and actuators continue axial movement and engagement, forces applied between the actuators, specifically actuator portion collars 26 and 27, and the contacting or engaging surfaces therefore, create a rotation of collar 26 as a result of the coupling of spring loaded ball pins 28 and helical grooves 24. This creates a helical movement of actuator 14, and in preferred embodiment helical movement of collar 26. The helical grooves may be provided in some preferred embodiments as four helical grooves, and in preferred embodiments, 180 degree helical grooves. Rotation of the actuator 14, or collar 26 in some embodiments, creates a corresponding, and in some embodiment unitary, rotation of actuator 16, or collar 27 in some embodiments, due to engagement of the actuators and collars. In some embodiments, collar 27 rotates with housing 18 (depicted fully rotated in FIGS. 1 and 8A. Therefore, the actuators 14 and 16, and in some embodiments collars 26 and 27, may be unitarily rotationally actuated. This actuation may be provided as an axial movement of at least one actuator. Unitary rotational actuation of the actuators may be further provided upon an axial movement of at least one of the actuators, as movement of actuator 14, collar 26, and other elements such as cartridge 30 axially move against opposing compression forces of compression element 40, further described below. Additionally, in some embodiments, unitary rotational actuation of the actuators may be further provided upon a helical movement of one of the actuators, as previously described.

Figure 6:
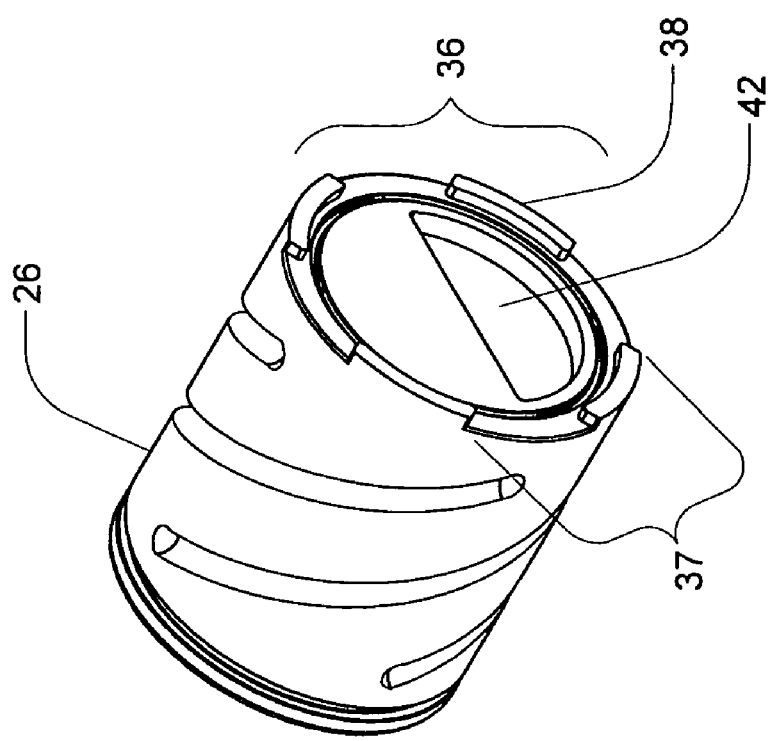
FIG. 6 is a perspective view of a collar of the embodiment with a VOST™ aperature shown.
Figure 7:
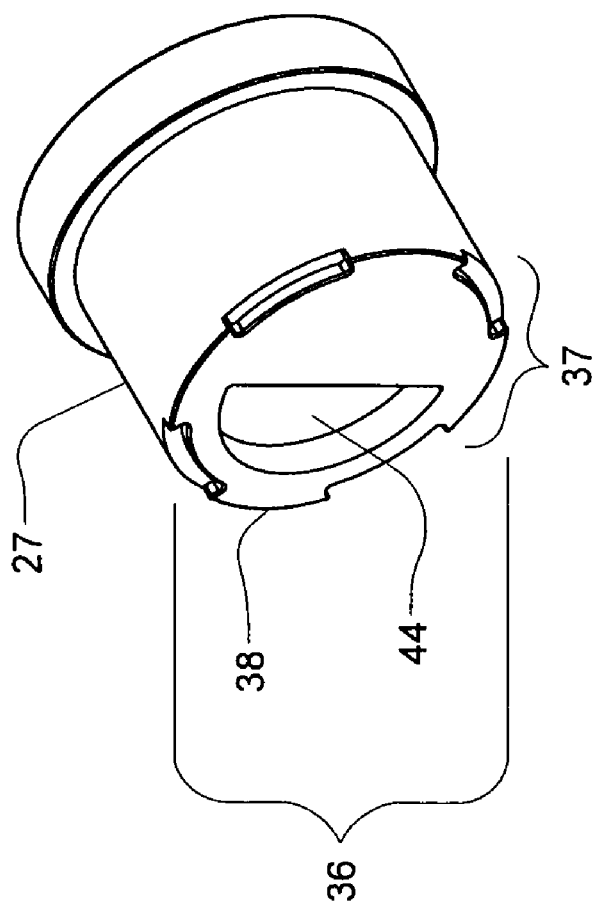
FIG. 7 is a perspective view of a second collar element of the embodiment for a VOST™ aperature design as shown.

Further referring to the actuators, generally, each actuator may comprise a flow aperture, and in some preferred embodiments, a venturi flow aperature 42 and 44, as shown in FIGS. 6 and 7 regarding embodiments of collars 26 and 27. As previously described, actuation of the actuators, and in some embodiments collars 26 and 27, is provided by rotational movement, and in some embodiments having 180 helical grooves, 180 degree rotational movement is provided and a corresponding unitary rotational actuation of the actuators. Rotation of the actuators creates in most situations a full flow or a no flow configuration of the actuators or the collars. A full flow configuration is shown in FIGS. 1 and 8A, providing rotation of the flow aperature about 180 degrees and in alignment with the venturi portions 46 and 48 of cartridges 30 and 32.

As referred to earlier, at least one compression element may be provided, the compression element potentially serving as a bias, in some embodiments, and as a seal force, in some embodiments, such that the actuators are biasingly or sealingly responsive, or both, to the compression element, and in some embodiments, responsive in a direction along a flow axis of the couplings. As the couplings and actuators are moved axially, both in engagement of the coupling device or system and in disengagement, the compression element provides counteracting forces to the axial movement of the various elements, creating, for example, a bias on the actuators. This bias, provided axially in the embodiments of the figures, may serve to aid in a engagement or a disengagement response of the actuator 14, such that collar 26 may rotate in a desired manner or such that collars 26 and 27 may appropriately engage, or may serve to aid in the sealing relationship of the various elements, such as that of the seals created during engagement of surfaces of collars 26 and 27.

Figure 5:
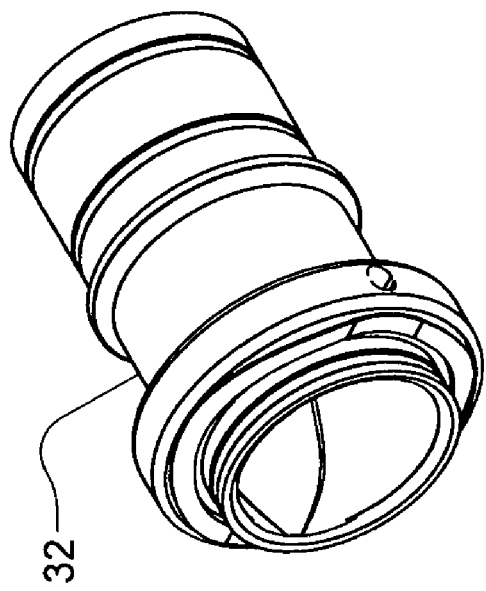
FIG. 5 is a perspective view of a second cartridge of the embodiment shown.

Additionally, it should be noted that other compression elements may be provided, such as compression springs, spring washers, spring seals, or thrust washers, consistent with the present invention. For example, a wave washer 50, as shown in FIGS. 3A and 5, for example, may be provided to assist in engagement of the collars, to assist in sealing the collars or other components, or the like.

Further embodiments of the present invention may include, but not be limited to the following additional features:

(1) The use of an offset venturi may allow transition from fully closed to fully open position without incurring large pressure drop and energy loss associated with typical quick disconnects.

(2) The use of spiral grooves and matching ball pins may convert axial displacement to rotation with minimal friction.

(3) The use of a rotary interlock between the two halves of the quick disconnect may force both faces to rotate in unison and may minimize void volume between the faces that could contribute to spillage when disengaging.

(4) The use of a spring washer may maintain face seal pressure on the flight side, and may thereby reduce the length and mass of the flight half of the quick disconnect.

(5) The provision of an easily accessible cavity between the mated halves of the quick disconnect, may accommodate instrumentation which may then detect flow, pressure, leakage, etc.

Figure 4:
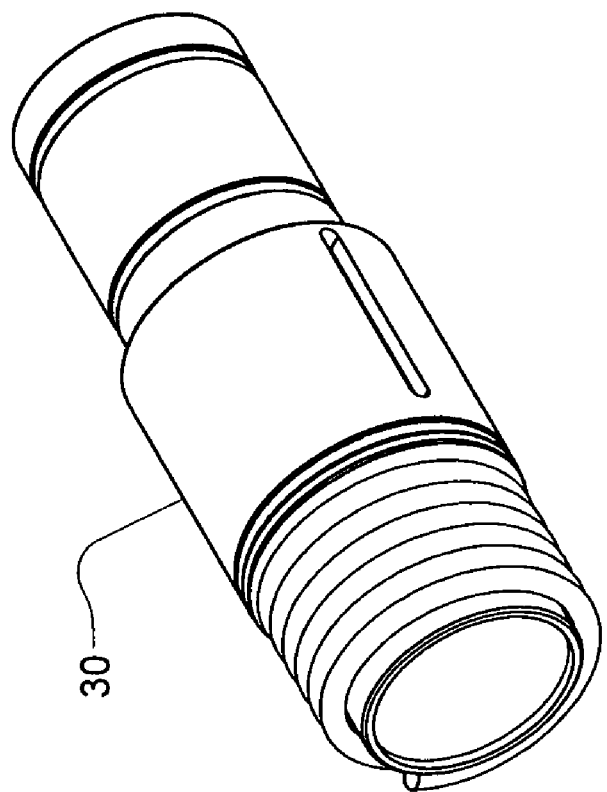
FIG. 4 is a perspective view of a cartridge of the embodiment shown.

As shown in FIG. 4, an in reference to ground side and flight side of flight applications, such as cryogenic fueling of a space shuttle, the ground side cartridge may move axially against a compression spring, with retaining pins sliding in two, diametrically opposed, axial slots (one shown in the figure). It may include a VOST™ ramp, providing half the venturi. Ring seals may be included to inhibit leakage from the flow path to the cavity separating the cartridge from the outer shell. The flight side cartridge such as shown in FIG. 5 may provide the other venturi half, and may include outer ring seals, along with a wave washer to maintain pressure on the face seal when two mating components are not engaged.

The ground side rotating collar such as shown in FIG. 6 may have a VOST™ aperature and four, 180° helical grooves. These grooves may be engaged by matching ball pins perhaps fixed to the outer shell, thus forcing rotation upon axial engagement. The ground side collar such as shown in FIG. 7 may also have four protruding bosses that may provide tongue-in-groove mating with the flight side collar.

Figure 9C:
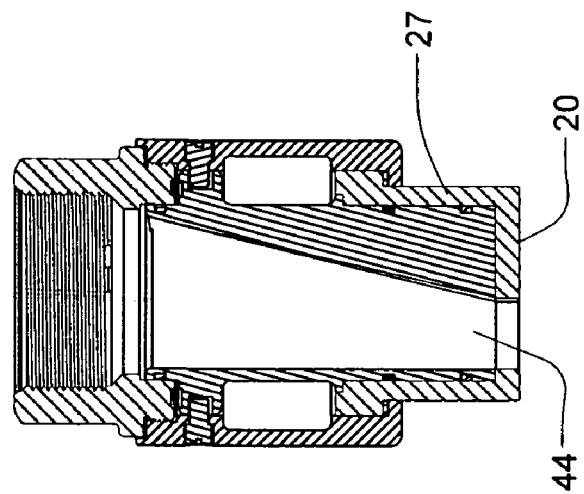
FIG. 9A is a perspective view of an assembled component of an embodiment shown in a perspective view, a side view in FIG. 9B, and in FIG. 9C a cross-section depicted through line A-A of the side view.
Figure 9B:
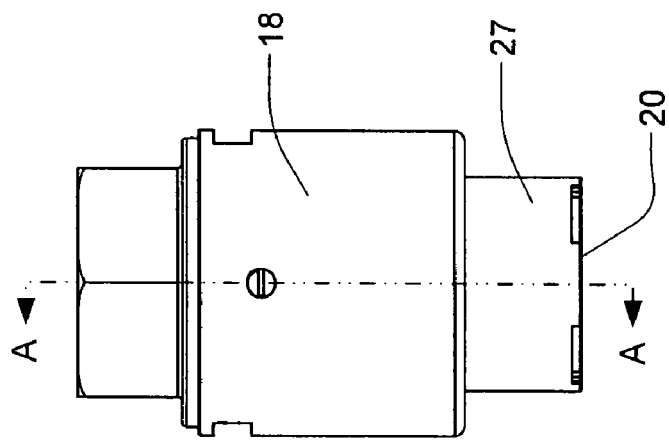
Figure 9A:
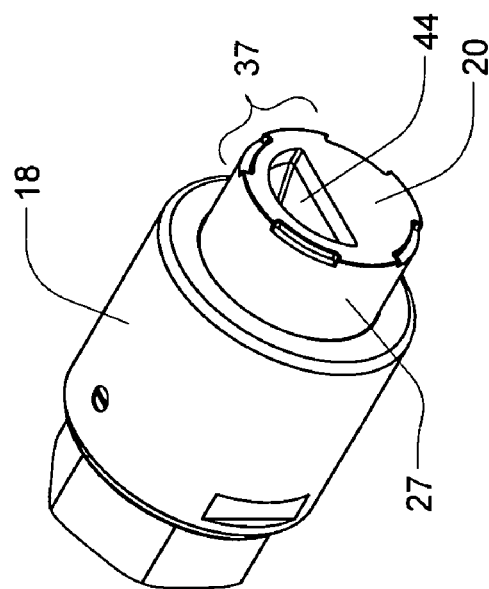
Figure 10:
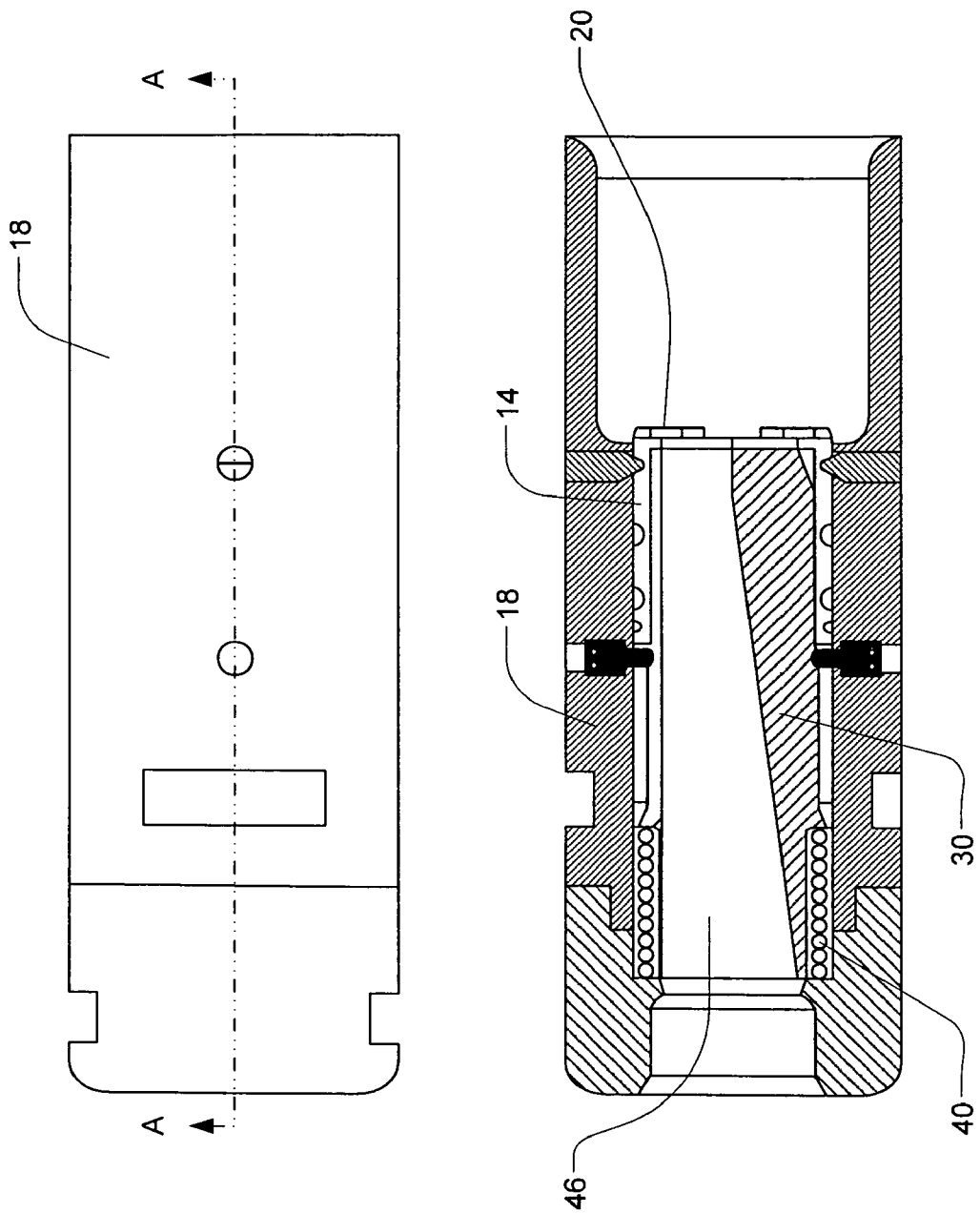
FIG. 10 is a side view of an assembled component of an embodiment shown in a side view and as a cross section depicted through line A-A of the side view.

As shown in the drawings depicted as FIGS. 8-10, a preferred embodiment can be designed as shown. This may include—but should not be understood as limited to—the elements listed or shown. Naturally, it should be understood that this is but one design using the various concepts of the invention. Other designs are, of course, possible using any selection of the principles disclosed herein.

As can be easily understood from the foregoing, the basic concepts of the present invention may be embodied in a variety of ways. It involves both fluid coupling techniques as well as devices to accomplish the appropriate fluid or other flow coupling or control. In this application, the flow coupling techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "actuator" should be understood to encompass disclosure of the act of "actuating"—whether explicitly discussed or not—and, conversely, were there effectively disclosure of the act of "actuating", such a disclosure should be understood to encompass disclosure of a "actuator" and even a "means for actuating". Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

It should be understood that for practical reasons and so as to avoid a large number of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

We claim:

1. A fluid coupling device, comprising:
   a first coupling comprising a first actuator; and
   a second coupling comprising a second actuator and configured to detachably engage said first coupling;
   wherein there is an axis of fluid flow through the first and second coupling,
   wherein said actuators are unitarily rotationally actuated along the axis of fluid flow through said couplings, and
   wherein said actuators are unitarily rotationally actuated upon helical movement of one of said actuators.

2. A fluid coupling device as described in claim 1 wherein said actuators are unitarily rotationally actuated upon helical movement of said actuators about a flow axis of at least one of said couplings.

3. A fluid coupling device as described in claim 1 wherein said one of said actuators comprises at least one helical groove.

4. A fluid coupling device as described in claim 3 wherein said one of said actuators comprises four helical grooves.

5. A fluid coupling device as described in claim 3 wherein said actuators are unitarily rotationally actuated to a no flow configuration upon helical movement of said one of said actuators in a first helical direction about the length of said helical groove and are unitarily rotationally actuated to a full flow configuration upon helical movement of said one of said actuators in a second helical direction about the length of said helical groove.

6. A fluid coupling device as described in claim 1 or 2, wherein said actuators are unitarily rotationally actuated upon axial movement of at least one of said actuators.

7. A fluid coupling device as described in claim 6 wherein said actuators are unitarily rotationally actuated upon axial movement of said at least one of said actuators along a flow axis of at least one of said couplings.

8. A fluid coupling device, comprising:
   a first coupling comprising a first actuator; and
   a second coupling comprising a second actuator and configured to detachably engage said first coupling;
   wherein there is an axis of fluid flow through the first and second couplings, and
   wherein said actuators are unitarily rotationally actuated along the axis of fluid flow thr couplings,
   further comprising a cavity formed by an engaged configuration of said couplings and a measuring device within said cavity.

9. A fluid coupling device as described in claim 8 wherein said measuring device comprises a measuring device selected from the group consisting of a flow meter, a pressure meter, or a leak detection device.

10. A fluid coupling device, comprising:
    a first coupling comprising a first actuator;
    a second coupling comprising a second actuator and configured to detachably engage said first coupling;
    wherein there is an axis of fluid flow through the first and second couplings;
    wherein said actuators are unitarily rotationally actuated along the axis of fluid flow through said couplings;
    wherein said actuators each comprises a collar;
    wherein said actuators each comprises an engagement element;
    wherein said engagement element comprises a rotary interlock;
    wherein said rotary interlock comprises at least one tongue and groove arrangement; and
    wherein said rotary interlock comprises at least one boss.

11. A fluid coupling device, comprising:
    a first coupling comprising a first actuator; and
    a second coupling comprising a second actuator and configured to detachably engage said first coupling;
    wherein there is an axis of fluid flow through the first and second couplings,
    wherein said actuators are unitarily rotationally actuated along the axis of fluid flow through said couplings,
    wherein each of said actuators comprises a rotatable flow aperture formed by said actuator, and
    wherein said rotatable flow aperture comprises a venturi flow aperture.

12. A fluid coupling device, comprising:
    a first coupling comprising a first actuator; and
    a second coupling comprising a second actuator and configured to detachably engage said first coupling;
    wherein there is an axis of fluid flow through the first and second couplings,
    wherein said actuators are unitarily rotationally actuated along the axis of fluid flow through said couplings,
    wherein each of said couplings comprises a housing and a cartridge coupled to said housing,
    wherein each of said cartridges have a fluid flow path, and
    wherein each of said cartridges comprises a venturi portion.

13. A fluid coupling device as described in claim 12 wherein said fluid flow paths of each of said cartridges from a venturi.

14. A fluid coupling device as described in claim 13 wherein said venturi comprises an offset venturi.

15. A method of coupling fluid sources, comprising the steps of:
    coupling a first coupling to a fluid source, said first coupling coupled with an actuator;
    coupling a second coupling to a fluid source, said second coupling coupled with an actuator; and wherein there is an axis of fluid flow through the first and second couplings, unitarily rotationally actuating said actuators along the axis of fluid flow through said couplings, wherein said step of unitarily rotationally actuating said actuators comprises helically moving at least one of said actuators.

16. A method of coupling fluid sources as described in claim 15 wherein said step of helically moving at least one of said actuators comprises helically moving at least one of said actuators along a flow axis of at least one of said couplings.

17. A method of coupling fluid sources as described in claim 15 wherein said step of unitarily rotationally actuating said actuators comprises actuating said actuators to a no flow configuration upon helically moving at least one of said actuators in a first direction about the length on a helical groove of said at least one actuator and actuating said actuators to a full flow configuration upon helically moving at least one of said actuators in a second direction about the length of a helical groove of said at least one actuator.

18. A method of coupling fluid sources as described in claim 15 or 16, wherein said step on unitarily rotationally actuation said actuators comprises axially moving at least one of said actuators.

19. A method of coupling fluid sources as described in claim 18 wherein said step of axially moving at least one of said actuators comprises axially moving at least one of said actuators along a flow axis of at least one of said couplings.

20. A method of coupling fluid sources as described in claim 15, further comprising the step of engaging said actuators prior to said step of unitarily rotationally actuating said actuators.

21. A method of coupling fluid sources as described in claim 16, further comprising the step of engaging said actuators prior to said step of unitarily rotationally actuating said actuators.

22. A method of coupling fluid sources as described in claim 18, further comprising the step of engaging said actuators prior to said step of unitarily rotationally actuating said actuators.

23. A method of coupling fluid sources as described in claim 20 wherein said step of engaging comprises contacting said actuators.

24. A method of coupling fluid sources as described in claim 21 wherein said step of engaging comprises contacting said actuators.

25. A method of coupling fluid sources as described in claim 22 wherein said step of engaging comprises contacting said actuators.

26. A method of coupling fluid sources as described in claim 23 wherein said step of engaging comprises rotationally interlocking said actuators.

27. A method of coupling fluid sources as described in claim 24 wherein said step of engaging comprises rotationally interlocking said actuators.

28. A method of coupling fluid sources as described in claim 25 wherein said step of engaging comprises rotationally interlocking said actuators.

29. A method of coupling fluid sources, comprising the steps of:
coupling a first coupling to a fluid source, said first coupling coupled with an actuator;
coupling a second coupling to a fluid source, said second coupling coupled with an actuator; and
wherein there is an axis of fluid flow through the first and second couplings, unitarily rotationally actuating said actuators along the axis of fluid flow through said couplings,
further comprising the step of detachably engaging said first coupling to said second coupling,
wherein said step of detachably engaging comprises the step of forming a cavity from an engaged configuration of said first coupling and said second coupling, and
further comprising the step of measuring fluid parameters from a measuring device within said cavity.

30. A method of coupling fluid sources as described in claim 29 wherein the step of measuring fluid parameters comprises measuring fluid parameters selected from the group consisting of: flow measurements, pressure measurements, or leak detection measurements.

31. A method of coupling fluid sources, comprising the steps of:
coupling a first coupling to a fluid source, said first coupling coupled with an actuator;
coupling a second coupling to a fluid source, said second coupling coupled with an actuator;
wherein there is an axis of fluid flow through the first and second couplings, unitarily rotationally actuating the axis of fluid flow through said couplings,
further comprising the step of flowing a fluid through a flow path of said couplings,
wherein said step of flowing a fluid comprises flowing a fluid through a venturi of said couplings.

32. A method of coupling fluid sources as described in claim 31 wherein said step of flowing a fluid comprises flowing a fluid through an offset venturi of said couplings.

33. A fluid coupling device, comprising:
a first coupling comprising a first actuator;
a second coupling comprising a second actuator and configured to detachably engage said first coupling;
wherein there is an axis of fluid flow through the first and second couplings;
wherein said actuators are unitarily rotationally actuated along the axis of fluid flow through said couplings;
wherein said actuators each comprises an engagement element;
wherein said engagement element comprises a rotary interlock;
wherein said rotary interlock comprises at least one tongue and groove arrangement; and
wherein said rotary interlock comprises at least one boss.

* * * * *